United States Patent
Cho (10) Patent No.: US 9,737,142 B2
(45) Date of Patent: Aug. 22, 2017

(54) FURNITURE SYSTEM AND METHOD FOR ARRANGING THE SAME

(71) Applicant: Choong Chul Cho, Seoul (KR)

(72) Inventor: Choong Chul Cho, Seoul (KR)

( * ) Notice: Subject to any disclaimer, the term of this patent is extended or adjusted under 35 U.S.C. 154(b) by 0 days.

(21) Appl. No.: 14/893,393

(22) PCT Filed: Mar. 20, 2014

(86) PCT No.: PCT/KR2014/002346
§ 371 (c)(1),
(2) Date: Nov. 23, 2015

(87) PCT Pub. No.: WO2014/148837
PCT Pub. Date: Sep. 25, 2014

(65) Prior Publication Data
US 2016/0095433 A1   Apr. 7, 2016

(30) Foreign Application Priority Data

Mar. 20, 2013 (KR) .................. 10-2013-0029893

(51) Int. Cl.
| | | |
|---|---|---|
| A47B 87/00 | (2006.01) | |
| A47B 83/00 | (2006.01) | |
| H02G 3/04 | (2006.01) | |
| A47B 21/06 | (2006.01) | |
| A47B 13/10 | (2006.01) | |

(52) U.S. Cl.
CPC .......... *A47B 87/002* (2013.01); *A47B 83/001* (2013.01); *H02G 3/0493* (2013.01); *A47B 13/10* (2013.01); *A47B 2021/066* (2013.01); *A47B 2083/003* (2013.01); *A47B 2087/004* (2013.01); *A47B 2200/12* (2013.01)

(58) Field of Classification Search
CPC ............ A47B 87/002; A47B 2021/066; A47B 2087/004; A47B 83/001; A47B 2083/003
See application file for complete search history.

(56) References Cited

U.S. PATENT DOCUMENTS

| | | | | |
|---|---|---|---|---|
| 2,694,614 A | * | 11/1954 | Dent .................... | A47B 83/001 108/60 |
| 4,353,411 A | * | 10/1982 | Harter ...................... | F24F 7/04 165/129 |
| 4,974,915 A | * | 12/1990 | Bussard ................. | A47B 49/00 108/50.11 |

(Continued)

FOREIGN PATENT DOCUMENTS

| | | |
|---|---|---|
| JP | H 5-29368 U | 4/1993 |
| KR | 20-0347072 Y1 | 4/2004 |

OTHER PUBLICATIONS

Korean Office Action dated May 22, 2014, issued to Korean Application No. 10-2014-0006098.

(Continued)

*Primary Examiner* — Daniel Rohrhoff
(74) *Attorney, Agent, or Firm* — Stein IP, LLC (57) ABSTRACT

The present invention relates to a furniture system and a method for arranging the same capable of improving a space efficiency using a rectangular pillar. In accordance with the present invention, a plurality of tables can be arranged efficiently in a limited space without sacrificing the convenience and privacy of the users of the tables.

10 Claims, 10 Drawing Sheets

(56) References Cited

U.S. PATENT DOCUMENTS

| | | | | |
|---|---|---|---|---|
| 5,044,135 A * | 9/1991 | Kroon | ............... | A47B 83/001 |
| | | | | 108/60 |
| 5,065,832 A * | 11/1991 | Mark | ................. | A47B 21/06 |
| | | | | 108/50.02 |
| 5,660,120 A * | 8/1997 | Sims | ................ | A47B 21/00 |
| | | | | 108/50.02 |
| 6,571,519 B1 * | 6/2003 | Diffrient | ........... | E04B 2/7424 |
| | | | | 160/135 |
| 6,759,589 B1 * | 7/2004 | VanderVelde | ........ | A47B 21/06 |
| | | | | 174/481 |
| 9,433,282 B2 * | 9/2016 | Steelman | ............ | A47B 13/02 |
| 2004/0082334 A1 * | 4/2004 | Petrick | ............... | A47B 21/00 |
| | | | | 455/450 |
| 2015/0083870 A1 * | 3/2015 | Steelman | ............ | F16B 12/44 |
| | | | | 248/121 |

OTHER PUBLICATIONS

Korean Office Action dated Sep. 16, 2013, issued to Korean Application No. 10-2013-0029893.

International Search Report dated Jun. 19, 2014, issued to International Application No. PCT/KR2014/002346.

* cited by examiner

FURNITURE SYSTEM AND METHOD FOR ARRANGING THE SAME

CROSS-REFERENCE TO RELATED APPLICATIONS

This application is a national stage of International Application No. PCT/KR2014/002346, filed Mar. 20, 2014, which claims the benefit of priority to Korean Application No. 10-2013-0029893, filed Mar. 20, 2013, in the Korean Intellectual Property Office, the disclosures of which are incorporated herein by reference.

TECHNICAL FIELD

The present invention relates to a furniture system and a method for arranging the same capable of improving a space efficiency using a rectangular pillar.

BACKGROUND ART

Conventionally, a plurality of tables and a plurality of desks are arranged in line or to face one another in a limited space such as a library.

However, such arrangement of the tables and desks has low two-dimensional space efficiency because the chairs where the users of the tables of the desks sit occupy the entire side of the tables or the desks.

DISCLOSURE

Technical Problem

It is an object of the present invention to provide a furniture system and a method for arranging the same with improved space efficiency.

Technical Solution

In order to achieve above-described object of the present invention, there is provided a furniture system comprising: a first rectangular pillar; and a first table structure comprising a first table, a second table, a third table, a fourth table and a first pillar region where the first rectangular pillar is disposed, the first table, the second table, the third table, the fourth table comprising a rectangular first top plate, a rectangular second top plate, a rectangular third top plate and a rectangular fourth top plate, respectively, wherein long sides of the first top plate, the second top plate, the third top plate and the fourth top plate are in contact with short sides of the second top plate, the third top plate, the fourth top plate and the first top plate, respectively, and the first pillar region is at a center of the first table structure and defined by the long sides of the first top plate, the second top plate, the third top plate and the fourth top plate.

There is also provided a furniture system comprising: a first rectangular pillar; and a first table, a second table, a third table and a fourth table surrounding the first rectangular pillar in a pinwheel shape, the first table, the second table, the third table, the fourth table comprising a rectangular first top plate, a rectangular second top plate, a rectangular third top plate and a rectangular fourth top plate, respectively, wherein long sides of the first top plate, the second top plate, the third top plate and the fourth top plate are in contact with short sides of the second top plate, the third top plate, the fourth top plate and the first top plate, respectively.

There is also provided a method of arranging a furniture system comprising a first rectangular pillar, a first table having a rectangular first top plate, a second table having a rectangular second top plate, a third table having a rectangular third top plate and a fourth table having a rectangular fourth top plate, the method comprising: (a) providing the first rectangular pillar; and (b) arranging the first table, the second table, the third table and the fourth table to surround the first rectangular pillar in a pinwheel shape where long sides of the first top plate, the second top plate, the third top plate and the fourth top plate are in contact with short sides of the second top plate, the third top plate, the fourth top plate and the first top plate, respectively.

Advantageous Effects

The furniture system and the method for arranging the same is advantageous in that a plurality of tables can be arranged efficiently in a limited space without sacrificing the convenience and privacy of the users of the tables.

BEST MODE

A furniture system in accordance with the present invention will be described in detail with reference to accompanying drawings.

Figure 1A:
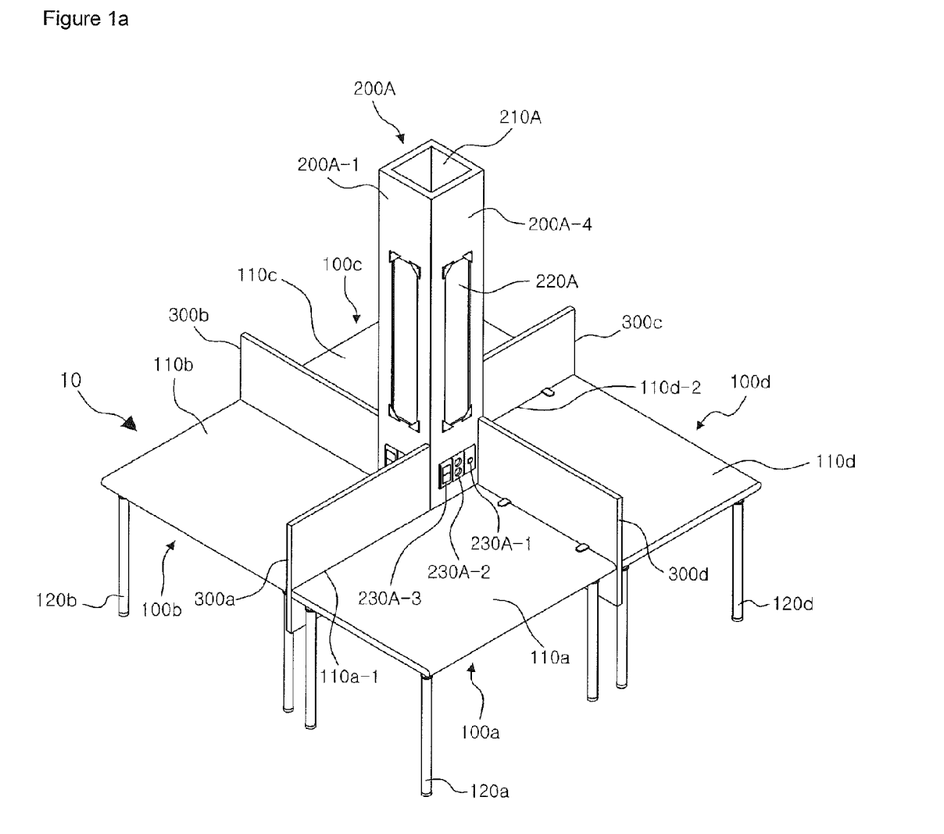
FIGS. 1a and 1b are perspective view and plan view of a furniture system in accordance with a first embodiment of the present invention.
Figure 1B:
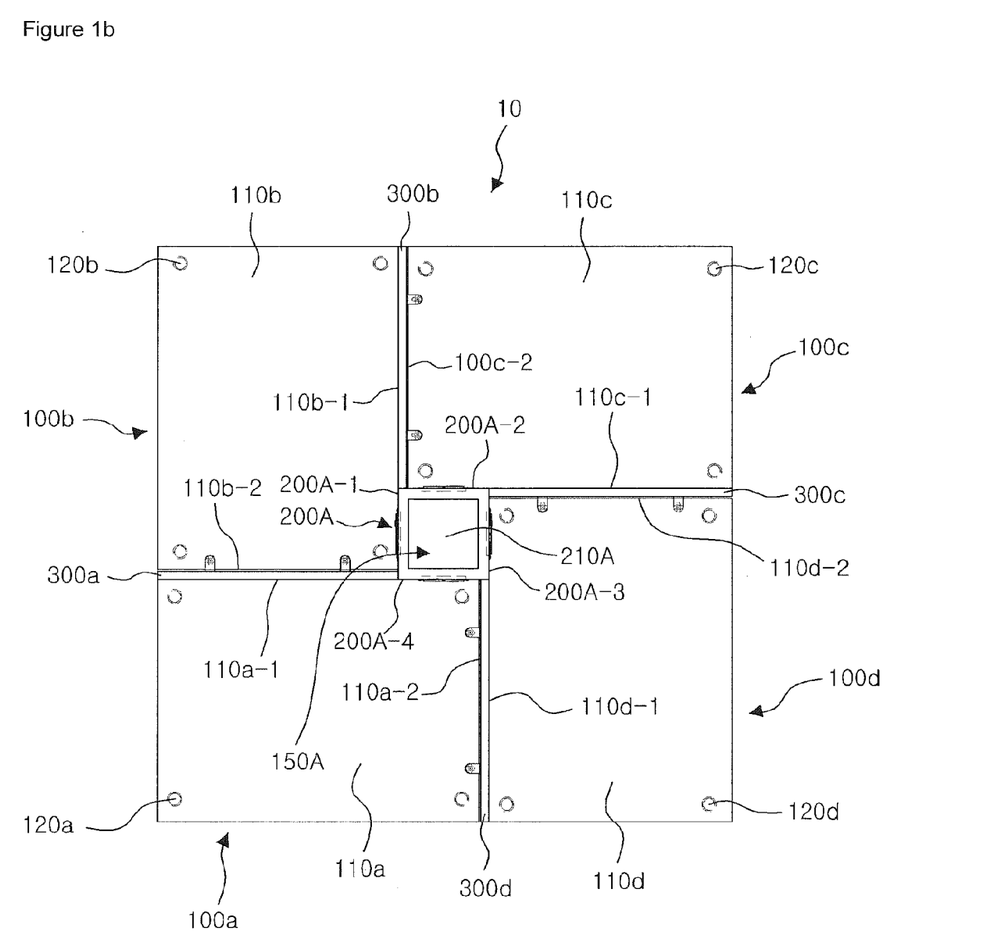

FIGS. 1a and 1b are perspective view and plan view of a furniture system in accordance with a first embodiment of the present invention.

Referring to FIGS. 1a and 1b, the furniture system in accordance with the first embodiment of the present invention comprises a first table 100a, a second table 100b, a third table 100c, a fourth table 100d and a first rectangular pillar 200A. The furniture system in accordance with the first embodiment of the present invention may further comprise a first partition 300a, a second partition 300b, a third partition 300c and a fourth partition 300d.

Figure 2A:
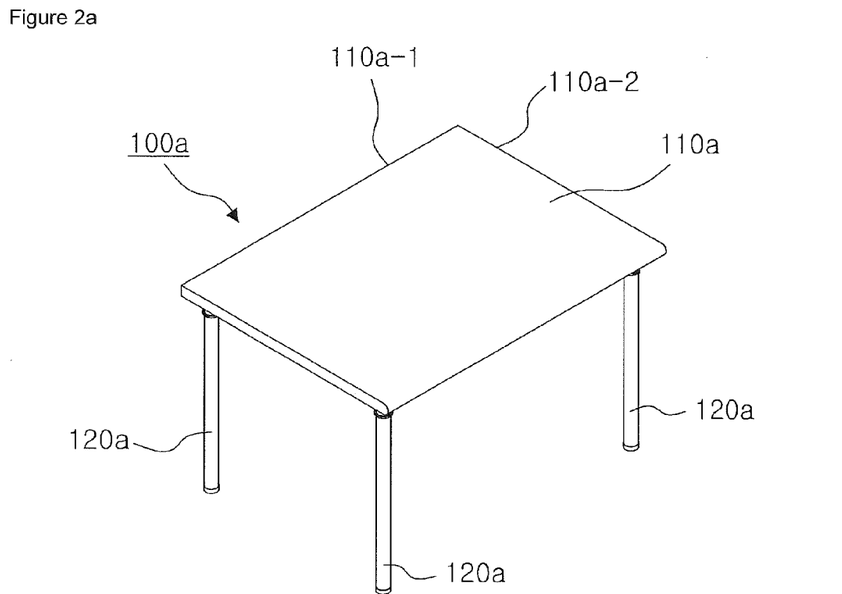
FIGS. 2a and 2b are perspective view and plan view of a first table in accordance with the first embodiment of the present invention.
Figure 2B:
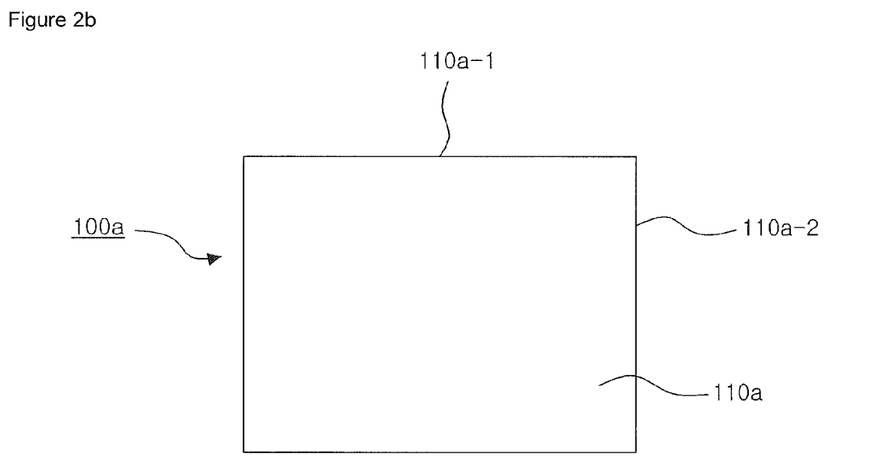

FIGS. 2a and 2b are perspective view and plan view of the first table 100a in accordance with the first embodiment of the present invention.

Referring to FIGS. 2a and 2b, the first table 100a comprises a first top plate 110a and one or more first support members 120a supporting the first top plate 110a. The first top plate 110a is preferably rectangular and has a long side 110a-1 and a short side 110a-2.

The structures of the second table 100b through the fourth table 100d are substantially the same as that of the first table 100a.

That is, as shown in FIG. 1b, the second table 100b comprises a rectangular second top plate 110b having a long side 110b-1 and a short side 110b-2 and one or more second support members 120b supporting the second top plate 110b, the third table 100c comprises a rectangular third top plate 110c having a long side 110c-1 and a short side 110c-2 and one or more third support members 120c supporting the third top plate 110c, and the fourth table 100d comprises a rectangular fourth top plate 110d having a long side 110d-1 and a short side 110d-2 and one or more fourth support members 120d supporting the fourth top plate 110d.

The furniture system in accordance with the first embodiment of the present invention will be described in more detail hereinafter.

Referring to FIGS. 1a and 1b, the first table 100a through the fourth table 100d, which constitute a first table structure 10, surround the first rectangular pillar 200A in a pinwheel shape.

As shown in FIGS. 1a and 1b, the long side 110a-1 of the first top plate 110a is in contact with the short side 110b-2 of the second top plate 110b, a long side 110b-1 of the second top plate 110b is in contact with a short side 110c-2 of the third top plate 110c, a long side 110c-1 of the third top plate 110c is in contact with a short side 110d-2 of the fourth top plate 110d, and a long side 110d-1 of the fourth top plate 110d is in contact with a short side 110a-2 of the first top plate 110a.

A first pillar region 150A is defined at a center of the first table structure 10 by the long sides 110a-1, 110b-1, 110c-1 and 110d-1 of the first top plate 110a, the second top plate 110b, the third top plate 110c and the fourth top plate 110d, respectively. The area of the first pillar region 150A is $(x-y)^2$, where x is a length of each of the long sides and y is a length of each of the short sides. The first rectangular pillar 200A is installed in the first pillar region 150A.

Although the length of one side of the first rectangular pillar 200A is (x−y) in FIG. 1b, the length of the one side of the first rectangular pillar 200A may be shorter than (x−y).

The first partition 300a through the fourth partition 300d are disposed at a contacting surface of the first top plate 110a and the second top plate 110b, a contacting surface of the second top plate 110b and the third top plate 110c, a contacting surface of the third top plate 110c and the fourth top plate 110d and a contacting surface of the fourth top plate 110d and the first top plate 110a, respectively.

Figure 3A:
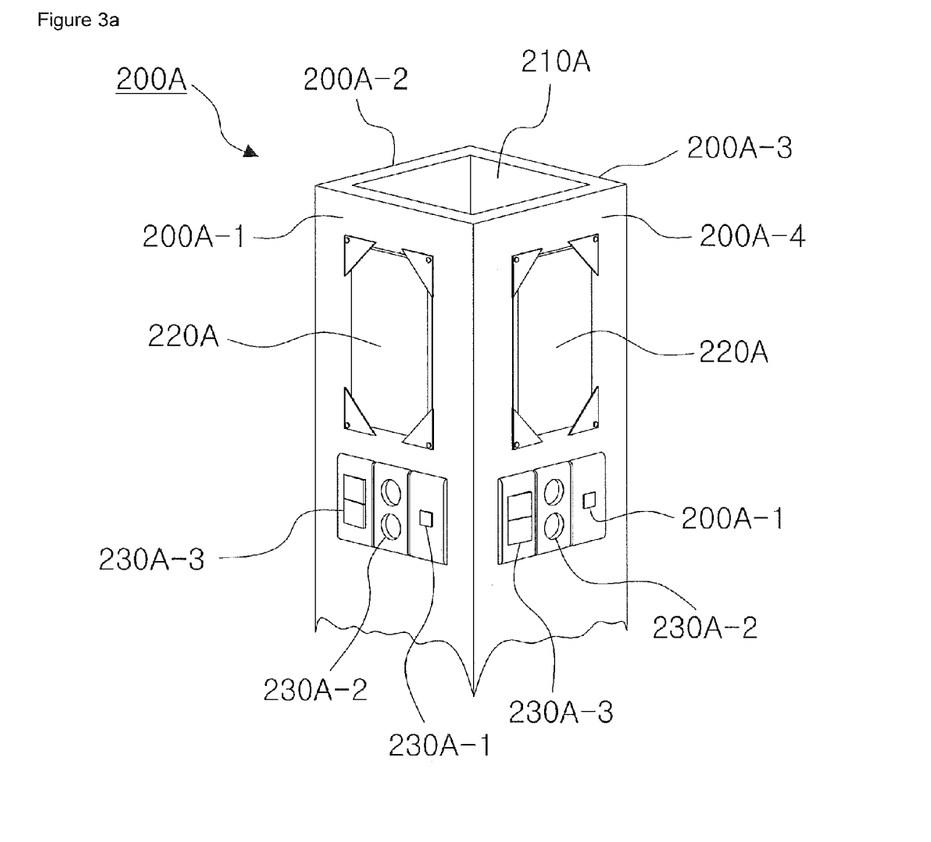
FIGS. 3a and 3b are perspective views of first rectangular pillar in accordance with the first embodiment and modified example.

FIG. 3a illustrates a perspective view of the first rectangular pillar 200A.

Referring to FIG. 3a, the first rectangular pillar 200A has a rectangular pipe shape with four sides 200A-1, 200A-2, 200A-3 and 200A-4 and two open ends. The first rectangular pillar 200A has a hollow center portion 210A defined by the four sides 200A-1, 200A-2, 200A-3 and 200A-4 at the center thereof.

A rectangular lighting unit 220A, a network connection port 230A-1, a power outlet 230A-2 and a switch 230A-3 for turning on and off the lighting unit 220A may be installed on each of the four sides 200A-1, 200A-2, 200A-3 and 200A-4.

It is preferable that the first rectangular pillar 200A extends from the floor to the ceiling of the space where the furniture system is installed in accordance with the first embodiment of the present invention. In such case, network cables and power cables may run from the ceiling through the hollow center portion 210A to the network connection port 230A-1 and the power outlet 230A-2 to minimize the exposure of cables.

Figure 3B:
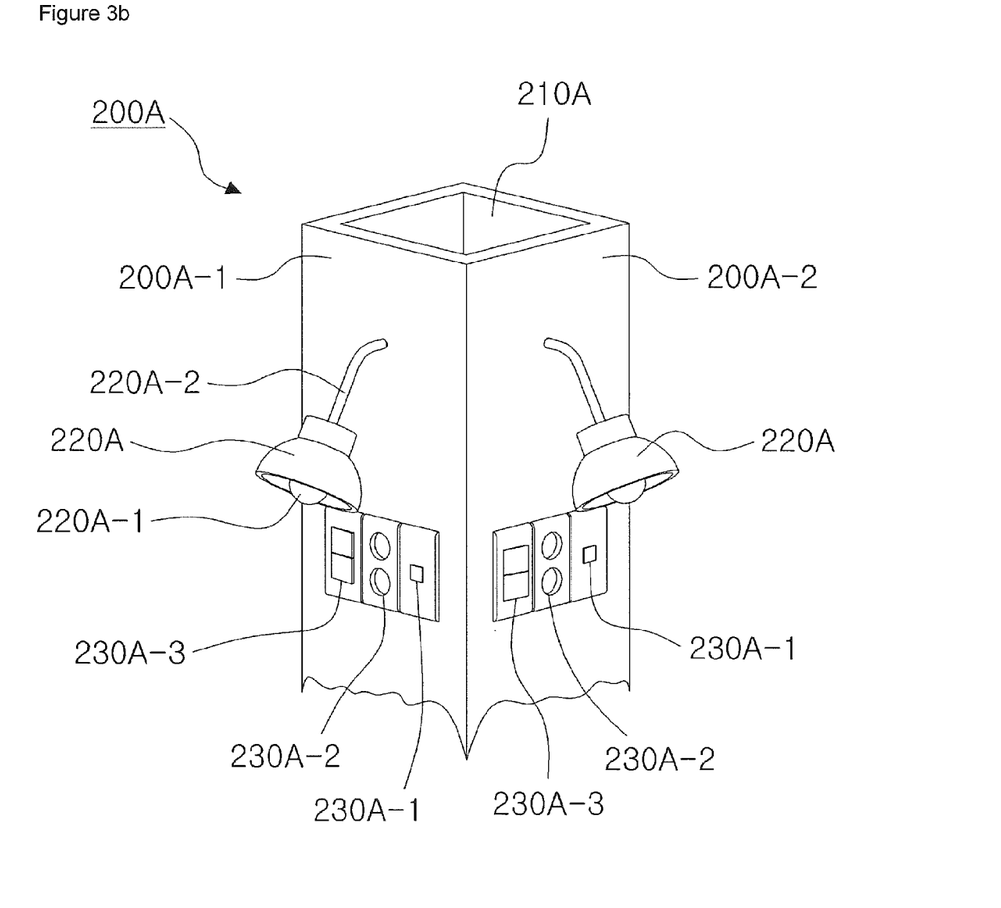

FIG. 3b illustrates modified example of the first rectangular pillar 200A.

As shown in FIG. 3b, a lighting unit 220A having a light bulb 220A-1 and a suspending member 220A-2, a network connection port 230A-1, a power outlet 230A-2 and a switch 230A-3 for turning on and off the lighting unit 220A may be installed on each of the four sides 200A-1, 200A-2, 200A-3 and 200A-4.

Figure 4A:
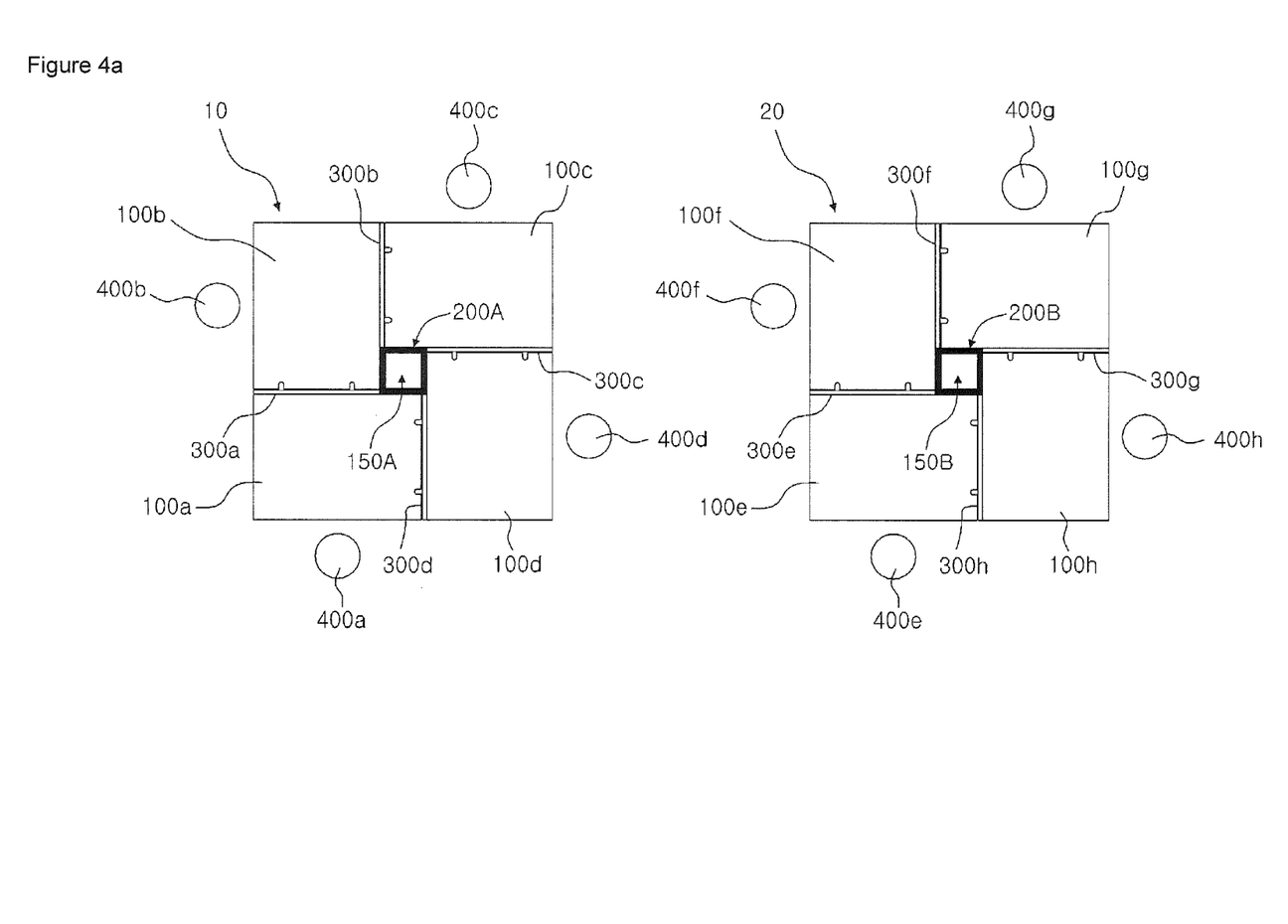
FIGS. 4a and 4b are plan views of an arrangement of a furniture system in accordance with the first embodiment of the present invention.
Figure 4B:
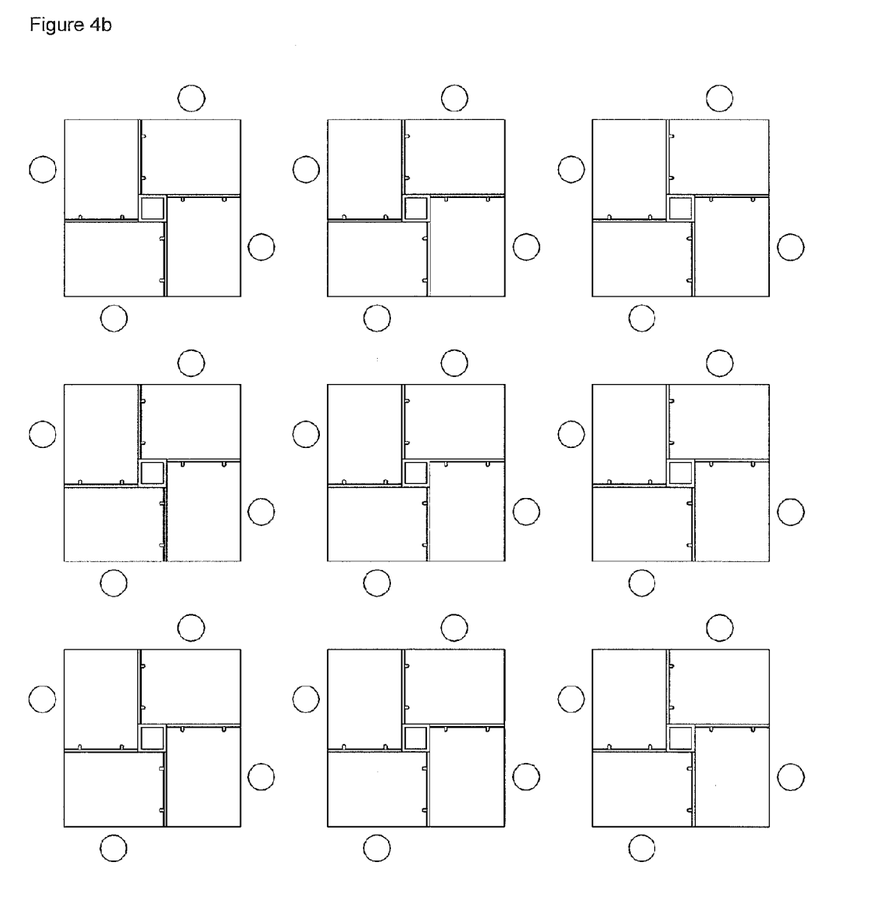

FIGS. 4a and 4b are plan views of an arrangement of the furniture system in accordance with the first embodiment of the present invention.

The furniture system shown in FIG. 4a includes: the first table 100a through the fourth table 100d; the first pillar region 150A; the first rectangular pillar 200A; and the first partition 300a through the fourth partition 300d, and further includes: a fifth table 100e through an eighth table 100h; a second pillar region 150B; a second rectangular pillar 200B; a fifth partition 300e through an eighth partition 300h; and a first chair 400a through an eighth chair 400h disposed adjacent to the first table 100a through the eighth table 100h, respectively.

The structures of the fifth table 100e through the eighth table 100h are substantially the same as that of the first table 100a.

That is, each of the fifth table 100e through the eighth table 100h comprises a rectangular top plate having a long side and a short side and one or more support members supporting the rectangular top plate.

The structures of the second pillar 200B and the fifth partition 300e through the eighth partition 300h are substantially the same as those of the first rectangular pillar 200A and the first partition 300a through the fourth partition 300d, respectively.

The fifth table 100e through the eighth table 100h, which constitute a second table structure 20, surround the second pillar 200B in a pinwheel shape.

The second pillar 200B is installed in the second pillar region 150B at the center of the second table structure 20.

The fifth partition 300e through the eighth partition 300h are installed in the same manner as the first partition 300a through the fourth partition 300d, respectively.

The first table structure 10 and the second table structure 20 are arranged to be spaced apart from each other where the long side of the first table 100a faces the short side of the sixth table 100f, and the short side of the second table 100b faces the long side of the fifth table 100e.

When the first table 100a through the eighth table 100h are arranged in a manner shown in FIG. 4a, the first chair 400a through the eight chair 400h may be placed alternately in a misaligned manner. This provides sufficient space between users using the first table structure and the second table structure, thereby improving space efficiency without sacrificing the convenience and privacy of the users.

FIG. 4b illustrates two-dimensionally expanded arrangement of the furniture system shown in FIG. 4a. The arrangement shown in FIG. 4b provides more improved space efficiency.

MODE OF THE INVENTION

Figure 5A:
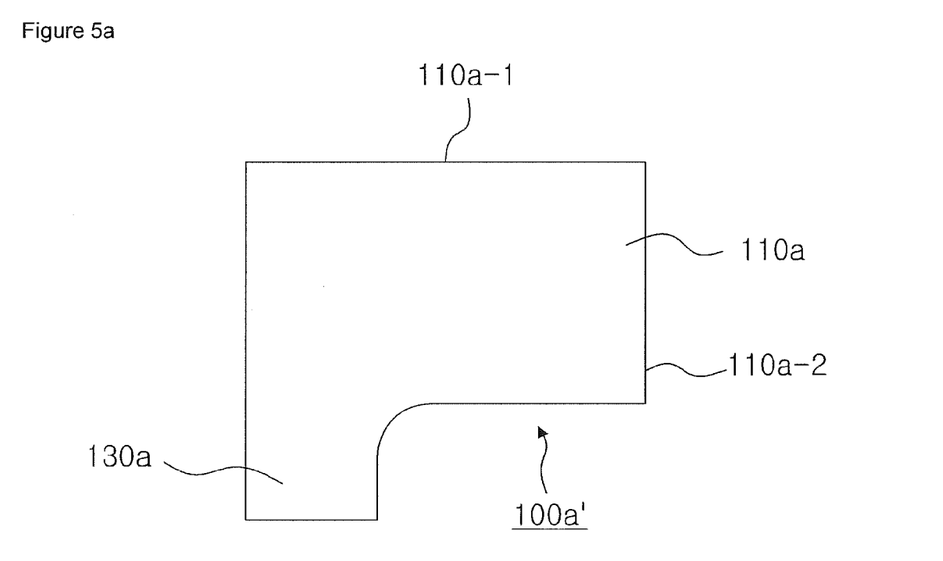
FIGS. 5a and 5b are plan views of a first table and a furniture system in accordance with a second embodiment of the present invention.
Figure 5B:
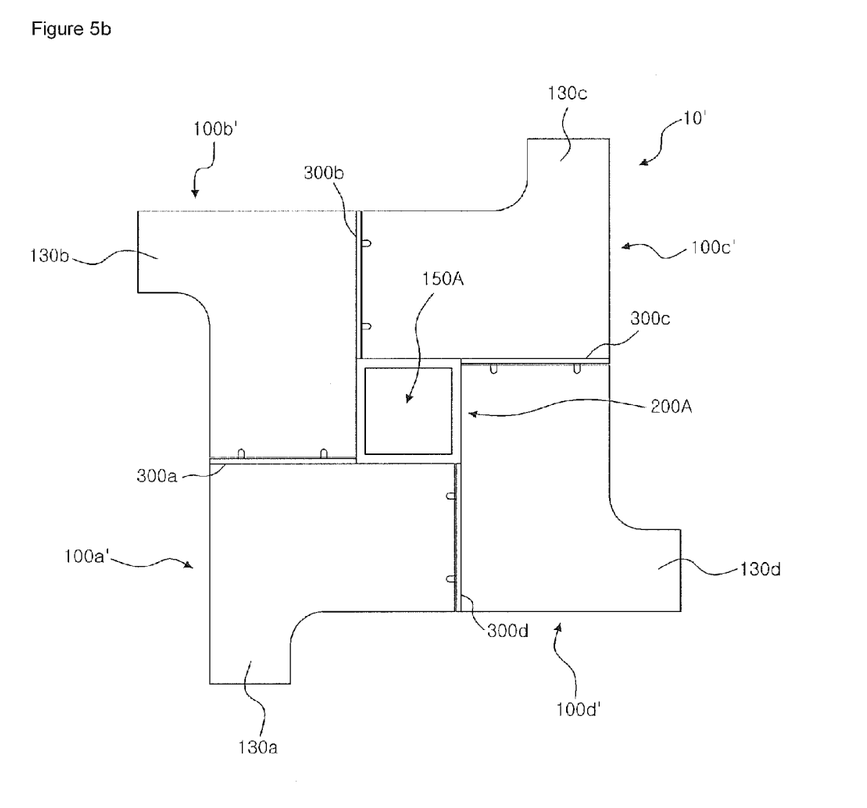

FIGS. 5a and 5b are plan views of a first table and a furniture system in accordance with a second embodiment of the present invention.

Referring to FIG. 5a, a first table 100a' in accordance with the second embodiment of the present invention comprises a first top plate 110a and a first support member 120a and further comprises a first extension member 130a. The first extension member 130a horizontally extends from the first top plate 110a on a same plane as the first top plate 110a. Other parts of the structure of the first table 100a' is the same as the first table 100a in accordance with the first embodiment.

Similarly, a second table 100b', a third table 100c' and a fourth table 100d' in accordance with the second embodiment comprises: a second top plate 110b and a second support members 120b; a third top plate 110c and a third support members 120c; and a fourth top plate 110d and a fourth support members 120d, respectively, and further comprises a second extension member 130b, a third extension member 130c and a fourth extension member 130d, respectively.

Referring to FIG. 5b, the furniture system in accordance with the second embodiment comprises the first table 100a' through the fourth table 100d'.

The first table 100a' through the fourth table 100d', which constitute a first table structure 10', surround a first rectangular pillar 200A in a pinwheel shape. Each of the first extension member 130a through the fourth extension member 130d extends from the first top plate 110a through the fourth top plate 110d in an outward direction with respect to the first table structure 10'.

Other parts of the structure of the furniture system in accordance with the second embodiment are the same as those of the furniture system in accordance with the first embodiment. Therefore, a detailed description thereof is omitted.

Figure 6:
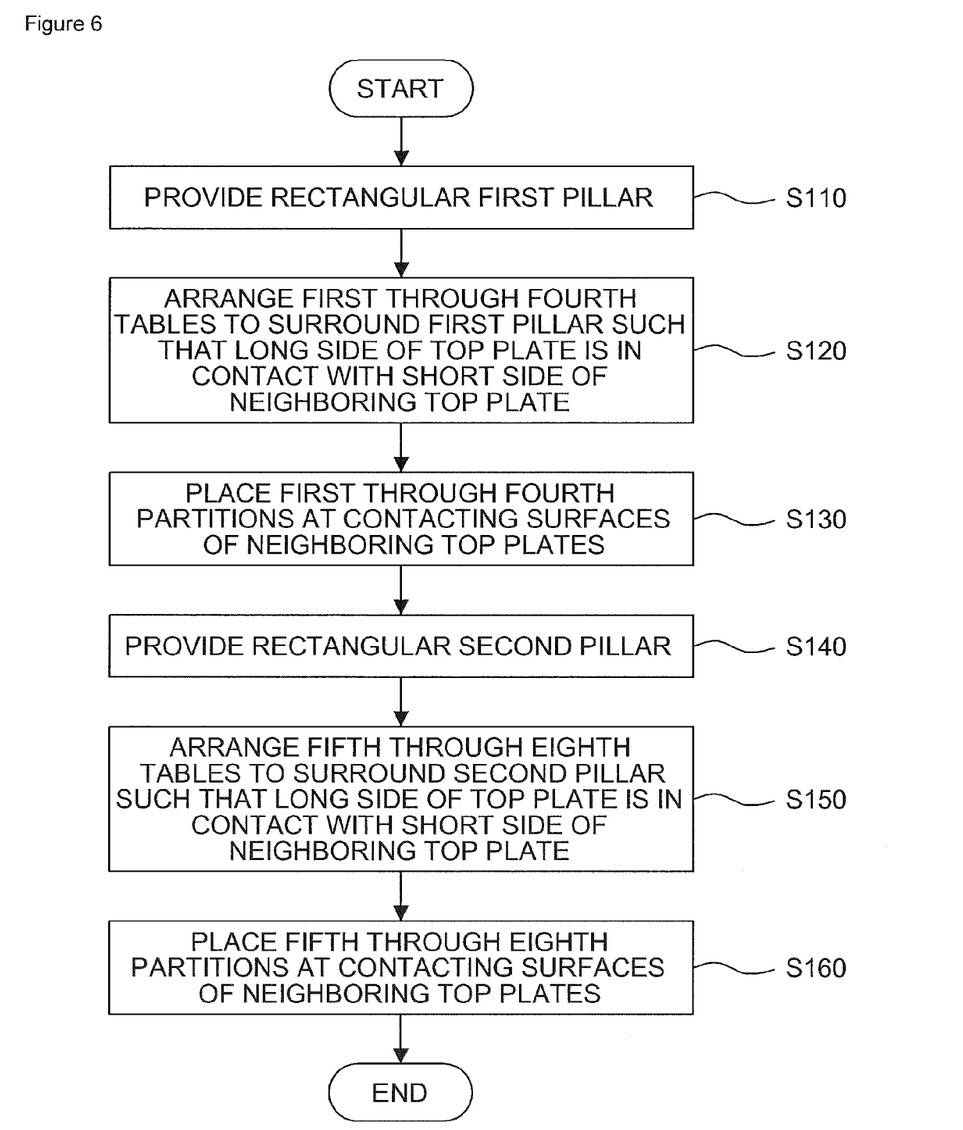
FIG. 6 is a flow diagram of a method of arranging a furniture system in accordance with the present invention.

FIG. 6 is a flow diagram of a method of arranging a furniture system in accordance with the present invention.

The furniture system including the first table through the fourth table having the first top plate through the fourth top plate and the first rectangular pillar may be arranged in accordance with the method of the present invention. That is, the furniture system used in the method of the present invention is one described hereinbefore.

Referring to FIG. 6, the first rectangular pillar is provided (S110).

Thereafter, the first table through the fourth table are arranged to surround the first rectangular pillar in a pinwheel shape where a long side of the first top plate, a long side of the second top plate, a long side of the third top plate and a long side of the fourth top plate are in contact with a short side of the second top plate, a short side of the third top plate, a short side of the fourth top plate and a short side of the first top plate, respectively (S120).

Thereafter, a first partition through a fourth partition are placed at a contacting surface of the first top plate and the second top plate, a contacting surface of the second top plate and the third top plate, a contacting surface of the third top plate and the fourth top plate and a contacting surface of the fourth top plate and the first top plate, respectively (S130).

Thereafter, a second pillar is provided (S140).

Thereafter, a fifth table through an eighth table are arranged to surround a rectangular second pillar in a pinwheel shape where a long side of a fifth top plate, a long side of a sixth top plate, a long side of a seventh top plate and a long side of an eighth top plate are in contact with a short side of the sixth top plate, a short side of the seventh top plate, a short side of the eighth top plate and a short side of the fifth top plate, respectively (S150).

In the step S150, the fifth table through the eighth table are arranged such that the long side of the first table faces the short side of the sixth table, and the long side of the fifth table faces the short side of the second table.

Thereafter, a fifth partition through an eighth partition are placed at a contacting surface of the fifth top plate and the sixth top plate, a contacting surface of the sixth top plate and the seventh top plate, a contacting surface of the seventh top plate and the eighth top plate and a contacting surface of the eighth top plate and the fifth top plate, respectively (S160).

The order of the steps S110-S160 may differ from one described above, and two or more of the steps S110-S160 may be performed simultaneously. For example, the step S120 may be performed first and the steps S110 and S130 may then be performed simultaneously.

INDUSTRIAL APPLICABILITY

The furniture system and the method for arranging the same provides high space efficiency when arranging a plurality of tables in a limited space without sacrificing the convenience and privacy of the users of the tables.

The invention claimed is:
1. A furniture system comprising:
   a first rectangular pillar; and
   a first table structure comprising a first table, a second table, a third table, a fourth table and a first pillar region where the first rectangular pillar is disposed, the first table, the second table, the third table, the fourth table comprising a rectangular first top plate, a rectangular second top plate, a rectangular third top plate and a rectangular fourth top plate, respectively,
   wherein each of the first top plate, the second top plate, the third top plate and the fourth top plate has a first long side, a first short side, a second long side opposite to the first long side and a second short side opposite to the first short side,
   wherein the first long sides of the first top plate, the second top plate, the third top plate and the fourth top plate are in contact with the first short sides of the second top plate, the third top plate, the fourth top plate and the first top plate, respectively, such that the first table structure has a square outline defined by the second long sides and the second short sides, and
   wherein the first pillar region is at a center of the first table structure and defined by the first long sides of the first top plate, the second top plate, the third top plate and the fourth top plate.

2. The furniture system in accordance with claim 1, further comprising:
   a first partition disposed at a contacting surface of the first top plate and the second top plate;
   a second partition disposed at a contacting surface of the second top plate and the third top plate;
   a third partition disposed at a contacting surface of the third top plate and the fourth top plate; and
   a fourth partition disposed at a contacting surface of the fourth top plate and the first top plate.

3. The furniture system in accordance with claim 1, further comprising:
   a second rectangular pillar; and
   a second table structure comprising a fifth table, a sixth table, a seventh table, an eighth table and a second pillar region where the second rectangular pillar is disposed, the fifth table, the sixth table, the seventh table, the eighth table comprising a fifth rectangular top plate, a sixth rectangular top plate, a seventh rectangular top plate and an eighth rectangular top plate, respectively, wherein each of the fifth top plate, the sixth top plate, the seventh top plate and the eighth top plate has a third long side, a third short side, a fourth long side opposite the third long side and a fourth short side opposite to the third short side, wherein the third long sides of the fifth top plate, the six top plate, the seventh top plate and the eighth top plate are in contact with the third short sides of the sixth top plate, the seventh top plate, the eighth top plate and the fifth top plate, respectively, such that the second table structure has a square outline defined by the fourth long sides and the fourth short sides, wherein the second pillar region is at a center of the second table structure and defined by the third long sides of the fifth top plate, the sixth top plate, the seventh top plate and the eighth top plate, and wherein the first table structure and the second table structure are arranged such that the second short side of the third top plate faces the fourth long side of the sixth top plate and the second long side of the fourth top plate faces the fourth short side of the fifth top plate.

4. The furniture system in accordance with claim 1, wherein an area of the first pillar region is $(x-y)2$, where x is a length of each of the first long sides and y is a length of each of the first short sides.

5. The furniture system in accordance with claim 1, wherein each of the first table, the second table, the third table and the fourth table further comprises an extension member horizontally extending from each of the first top plate, the second top plate, the third top plate and the fourth top plate.

6. The furniture system in accordance with claim 1, wherein the first rectangular pillar has a pipe shape with four sides and two open ends, and the first rectangular pillar further comprises a network connection port and a power outlet on each of the four sides.

7. The furniture system in accordance with claim 6, wherein the first rectangular pillar further comprises a lighting unit and a switch for turning on and off the lighting unit on each of the four sides.

8. A method of arranging a furniture system comprising a first rectangular pillar, a first table having a rectangular first top plate, a second table having a rectangular second top plate, a third table having a rectangular third top plate and a fourth table having a rectangular fourth top plate, each of the first top plate, the second top plate, the third top plate and the fourth top plate having a first long side, a first short side, a second long side opposite to the first long side and a second short side opposite to the first short side, the method comprising:

(a) providing the first rectangular pillar; and (b) arranging the first table, the second table, the third table and the fourth table to surround the first rectangular pillar in a pinwheel shape where the first long sides of the first top plate, the second top plate, the third top plate and the fourth top plate are in contact with the first short sides of the second top plate, the third top plate, the fourth top plate and the first top plate, respectively, such that a first table structure formed by arranging the first table, the second table, the third table and the fourth table has a square outline defined by the second long sides and the second short sides, wherein the first pillar region is at a center of the first table structure and defined by the first long sides of the first top plate, the second top plate, the third top plate and the fourth top plate.

9. The method in accordance with claim 8, further comprising: (c) placing a first partition, a second partition, a third partition and a fourth partition at contacting surfaces of the first top plate and the second top plate, the second top plate and the third top plate, the third top plate and the fourth top plate and the fourth top plate and the first top plate, respectively.

10. The method in accordance with claim 8, wherein the furniture system further comprises a fifth table having a fifth rectangular top plate, a sixth table having a sixth rectangular top plate, a seventh table having a seventh rectangular top plate and an eighth table having an eighth rectangular top plate, each of the fifth top plate, the sixth top plate, the seventh top plate and eighth top plate has a third long side, a third short side, a fourth long side opposite to the third long side and a fourth short side opposite to the third short side, further comprising:

(d) providing the second rectangular pillar; and (e) arranging the fifth table, the sixth table, the seventh table and the eighth table to surround the second rectangular pillar in a pinwheel shape where the third long sides of the fifth top plate, the sixth top plate, the seventh top plate and the eighth top plate are in contact with the third short sides of the sixth top plate, the seventh top plate, the eighth top plate and the fifth top plate, respectively, such that a second table structure formed by arranging the fifth table, the sixth table, the seventh table and the eighth table has a square outline defined by the fourth long sides and the fourth short sides, wherein the second pillar region is at a center of the second table structure and defined by the third long sides of the fifth top plate, the sixth top plate, the seventh top plate and the eighth top plate, and wherein the second short side of the third top plate faces the fourth long side of the sixth top plate and the second long side of the fourth top plate faces the fourth short side of the fifth top plate.

* * * * *